United States Patent
Hwang et al.

(10) Patent No.: US 9,191,050 B1
(45) Date of Patent: Nov. 17, 2015

(54) MULTI-LAYER COEFFICIENT CONTROL FOR DYNAMIC INTERFERENCE CANCELLATION

(71) Applicant: QUALCOMM Incorporated, San Diego, CA (US)

(72) Inventors: Insoo Hwang, San Diego, CA (US); Bongyong Song, San Diego, CA (US); Cong Nguyen, San Diego, CA (US); Peter David Heidmann, San Diego, CA (US); Samir Salib Soliman, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/465,741

(22) Filed: Aug. 21, 2014

(51) Int. Cl.
*H04B 1/10* (2006.01)
*H04B 1/12* (2006.01)

(52) U.S. Cl.
CPC .............. *H04B 1/123* (2013.01); *H04B 1/1027* (2013.01)

(58) Field of Classification Search
CPC .......... H04B 1/126; H04B 1/525; H04B 1/56; H04L 1/24; H04L 5/1423; H04L 5/1461
USPC ............. 455/296, 278.1, 272, 295, 63.1, 138, 455/139, 249, 278, 436; 370/252, 278, 335, 370/342; 375/346, 232, 229, 296, 148, 144; 342/362, 373
See application file for complete search history.

(56) References Cited

U.S. PATENT DOCUMENTS

| | | | | |
|---|---|---|---|---|
| 4,992,798 | A * | 2/1991 | Nozue et al. | 342/362 |
| 5,046,133 | A * | 9/1991 | Watanabe et al. | 455/138 |
| 5,117,505 | A * | 5/1992 | Talwar | 455/278.1 |
| 6,661,835 | B1 * | 12/2003 | Sugimoto et al. | 375/148 |
| 7,522,883 | B2 | 4/2009 | Gebara et al. | |
| 8,396,177 | B1 * | 3/2013 | Morris | 375/346 |
| 8,472,555 | B2 * | 6/2013 | Balakrishnan et al. | 375/296 |
| 2002/0051433 | A1 * | 5/2002 | Affes et al. | 370/335 |
| 2008/0089451 | A1 * | 4/2008 | Taylor et al. | 375/346 |
| 2009/0103669 | A1 * | 4/2009 | Kolze et al. | 375/346 |
| 2010/0172511 | A1 * | 7/2010 | Togawa et al. | 381/71.11 |
| 2010/0201572 | A1 * | 8/2010 | Lackey et al. | 342/373 |
| 2011/0021170 | A1 | 1/2011 | Kolze et al. | |
| 2012/0108239 | A1 * | 5/2012 | Damnjanovic et al. | 455/436 |
| 2013/0301688 | A1 | 11/2013 | Khandani | |
| 2013/0309975 | A1 * | 11/2013 | Kpodzo et al. | 455/63.1 |
| 2014/0126403 | A1 * | 5/2014 | Siomina | 370/252 |
| 2014/0273906 | A1 * | 9/2014 | Feygin et al. | 455/296 |
| 2014/0348018 | A1 * | 11/2014 | Bharadia et al. | 370/252 |

* cited by examiner

*Primary Examiner* — Tan H Trinh
(74) *Attorney, Agent, or Firm* — Loza & Loza LLP

(57) ABSTRACT

Aspects of the disclosure are directed to interference cancellation and wireless communication including determining the strength of a reference signal; comparing the strength of the reference signal to a first threshold and a second threshold; and performing one of the following: updating at least one coefficient if the strength of the reference signal is above the first threshold; freezing the at least one coefficient if the strength of the reference signal is between the first threshold and the second threshold; or setting an interference cancelation (IC) circuit to OFF if the strength of the reference signal is below both the first threshold and the second threshold.

30 Claims, 11 Drawing Sheets

MULTI-LAYER COEFFICIENT CONTROL FOR DYNAMIC INTERFERENCE CANCELLATION

TECHNICAL FIELD

This disclosure relates generally to the field of interference cancellation systems and methods, and, in particular, to controlling cancellation of interference produced by multiple radios operating on the same, adjacent, harmonic/sub-harmonic, or intermodulation product frequencies.

BACKGROUND

Advanced wireless devices may have multiple radios (e.g., WWAN, WLAN, WPAN, GPS/GLONASS, etc.) that operate on the same, adjacent, or harmonic/sub-harmonic frequencies. However, some combinations of radios can cause co-existence issues due to interference between the respective frequencies. In particular, when one radio is actively transmitting at or close to the same frequency and at a same time that another radio is receiving, the transmitting radio can cause interference to (i.e., de-sense) the receiving radio. For example, same-band interference may occur between Bluetooth (WPAN) and 2.4 GHz WiFi (WLAN); adjacent band interference between WLAN and LTE band 7, 40, 41; harmonic/sub-harmonic interference may occur between 5.7 GHz ISM and 1.9 GHz PCS; and an intermodulation issue may occur between 7xx MHz and a GPS receiver.

Analog interference cancellation (AIC) cancels interference between a transmitter radio and a receiver radio by matching gain and phase of a wireless coupling path signal and in a wired AIC path, as shown in FIG. 1, where $d_t$ is a transmitted signal from a transmitter (aggressor) radio 102, and $h_c$ is a coupling channel (wireless coupling path signal) from the transmitter radio 102 to a receiver (victim) radio 104. AIC 106 attempts to cancel the impact of the coupling channel $h_c$ as reflected via the negative sign on the output of AIC 106. AIC may be implemented with respect to RF (radio frequency), baseband, or both RF/baseband.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Aspects of the disclosure provide for controlling analog interference cancellation (AIC) through turning on, freezing or turning off the analog interference cancellation circuit based on certain criteria. The disclosure provides for coupling either one or both of an RF switch which can physically disconnect the AIC circuit from the receiver (victim) radio (hereafter referred to as "receiver" or "victim receiver"), and/or a baseband-centric coefficient control logic that configures and/or determines coefficients to apply to an adaptive filter coupled to the receiver.

In some examples, a two-state initial state machine is applied. When the transmitter (aggressor) radio (hereafter referred to as "aggressor TX") is turned on, the baseband-centric coefficient control logic enters a "coefficient update state"; and when the aggressor TX is turned off, the baseband-centric coefficient control logic enters a state where the adaptive filter is turned off, and the last coefficient values are stored for use next time the aggressor TX is turned on.

In some examples, in the "coefficient update state," the baseband-centric coefficient control logic can choose between different states and control the coefficients in accordance with the measurement of the aggressor power level. When interference is high, the coefficients are updated to optimize interference cancellation at the victim receiver. Coefficient updating is frozen for moderate interference values because updating the coefficients can be noisy. Freezing the coefficients means using the previous coefficients rather than updating or obtaining new coefficients. At the lowest interference values (e.g., when the aggressor TX is off) any output from the AIC circuit is blocked from inputting to the victim receiver to prevent noise injection in the victim receiver band.

According to various aspects, a method of performing interference cancellation in a device having at least one transmitter and at least one receiver, the method includes determining the strength of a reference signal that corresponds to a transmission from the at least one transmitter; comparing the strength of the reference signal to a first threshold and a second threshold; and performing one of the following: a) updating at least one coefficient for an interference cancellation (IC) circuit if the strength of the reference signal is above the first threshold; b) freezing the at least one coefficient for the interference cancellation (IC) circuit if the strength of the reference signal is between the first threshold and the second threshold; or c) setting the interference cancelation (IC) circuit to an OFF state if the strength of the reference signal is below both the first threshold and the second threshold.

According to various aspects, an apparatus for performing interference cancellation includes at least one processor; a memory coupled to the at least one processor; at least one transmitter coupled to the at least one processor; at least one receiver coupled to the at least one processor; and an interference cancellation (IC) circuit coupled between the at least one transmitter and the at least one receiver, wherein the at least one processor is configured to: determine the strength of a reference signal that corresponds to a transmission from the at least one transmitter; compare the strength of the reference signal to a first threshold and a second threshold; and perform one of the following: a) updating at least one coefficient for the interference cancellation (IC) circuit if the strength of the reference signal is above the first threshold; b) freezing the at least one coefficient for the interference cancellation (IC) circuit if the strength of the reference signal is between the first threshold and the second threshold; or c) setting the interference cancelation (IC) circuit to an OFF state if the strength of the reference signal is below both the first threshold and the second threshold.

According to various aspects, an apparatus for performing interference cancellation includes at least one transmitter; at least one receiver; means for interference cancellation, coupled between the at least one transmitter and the at least one receiver; means for determining the strength of a reference signal that corresponds to a transmission from the at least one transmitter; means for comparing the strength of the reference signal to a first threshold and a second threshold; and means for performing one of the following: a) updating at least one coefficient for the interference cancellation means if the strength of the reference signal is above the first threshold; b) freezing the at least one coefficient for the interference cancellation means if the strength of the reference signal is between the first threshold and the second threshold; or c)

setting the interference cancelation means to an OFF state if the strength of the reference signal is below both the first threshold and the second threshold.

According to various aspects, a computer-readable medium storing computer executable code, operable on a device comprising at least one transmitter, at least one receiver, and an interference cancellation (IC) circuit coupled between the at least one transmitter and the at least one receiver, the computer executable code includes instructions for causing a computer to determine the strength of a reference signal that corresponds to a transmission from the at least one transmitter; instructions for causing the computer to compare the strength of the reference signal to a first threshold and a second threshold; and instructions for causing the computer to perform one of the following: a) updating at least one coefficient for the interference cancellation (IC) circuit if the strength of the reference signal is above the first threshold; b) freezing the at least one coefficient for the interference cancellation (IC) circuit if the strength of the reference signal is between the first threshold and the second threshold; or c) setting the interference cancelation (IC) circuit to an OFF state if the strength of the reference signal is below both the first threshold and the second threshold.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Various aspects of the disclosure relate to systems and methods for the control of in-device interference/cancellation for transmissions by one radio (transceiver) that affect the receiving performance of a second radio (transceiver) operating on the same or adjacent, harmonic/sub-harmonic frequencies, or intermodulation product frequencies. In particular aspects, an interference cancellation system is adaptable for different radio combinations. It should be noted that the terms cancellation (as in interference cancellation) and variants thereof may be synonymous with reduction, mitigation, and/or the like in that at least some interference is reduced.

In various representative aspects, the AIC circuit includes an analog one-tap least mean squares (LMS) adaptive filter configured to match the signal in the AIC path with the signal in the coupling path. In various representative aspects, the AIC circuit includes a plurality of taps and/or LMS adaptive filters. In further aspects of the disclosure, LMS adaptive filter coefficients may additionally or alternatively be calculated in the digital domain in accordance with the baseband signal.

Figure 1:
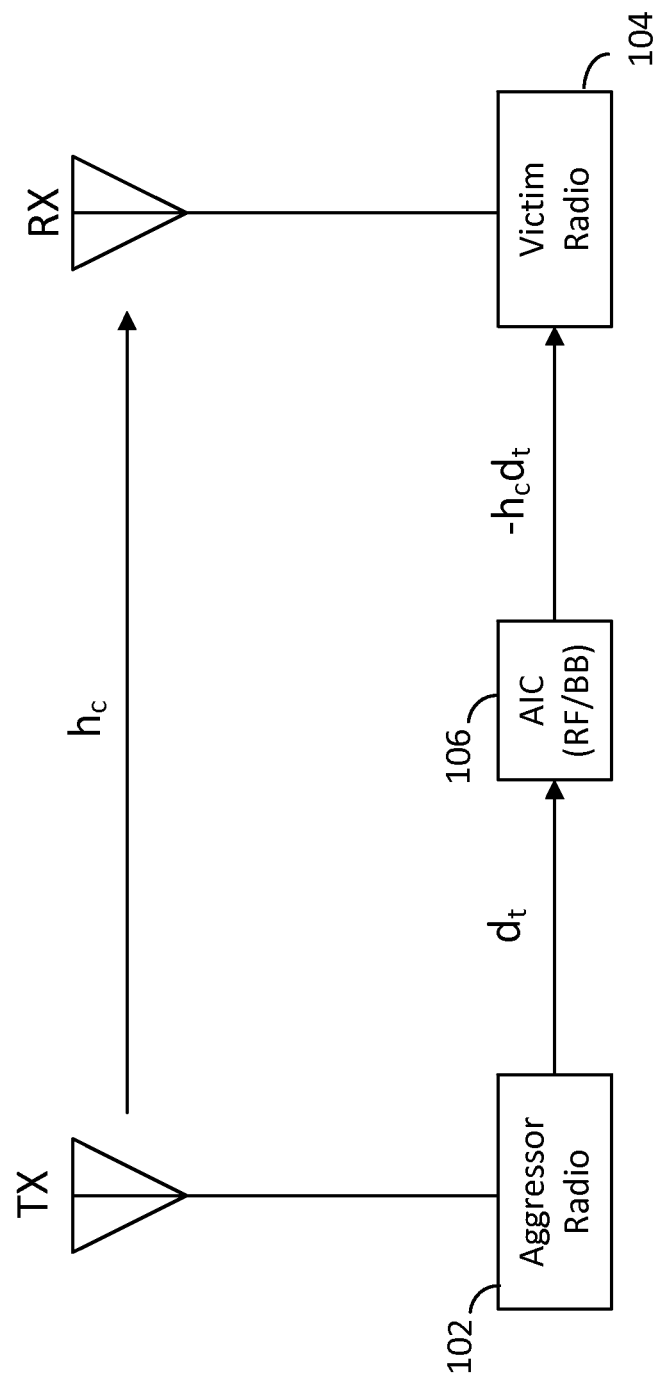
FIG. 1 is a block diagram of an interference cancellation system.
Figure 2:
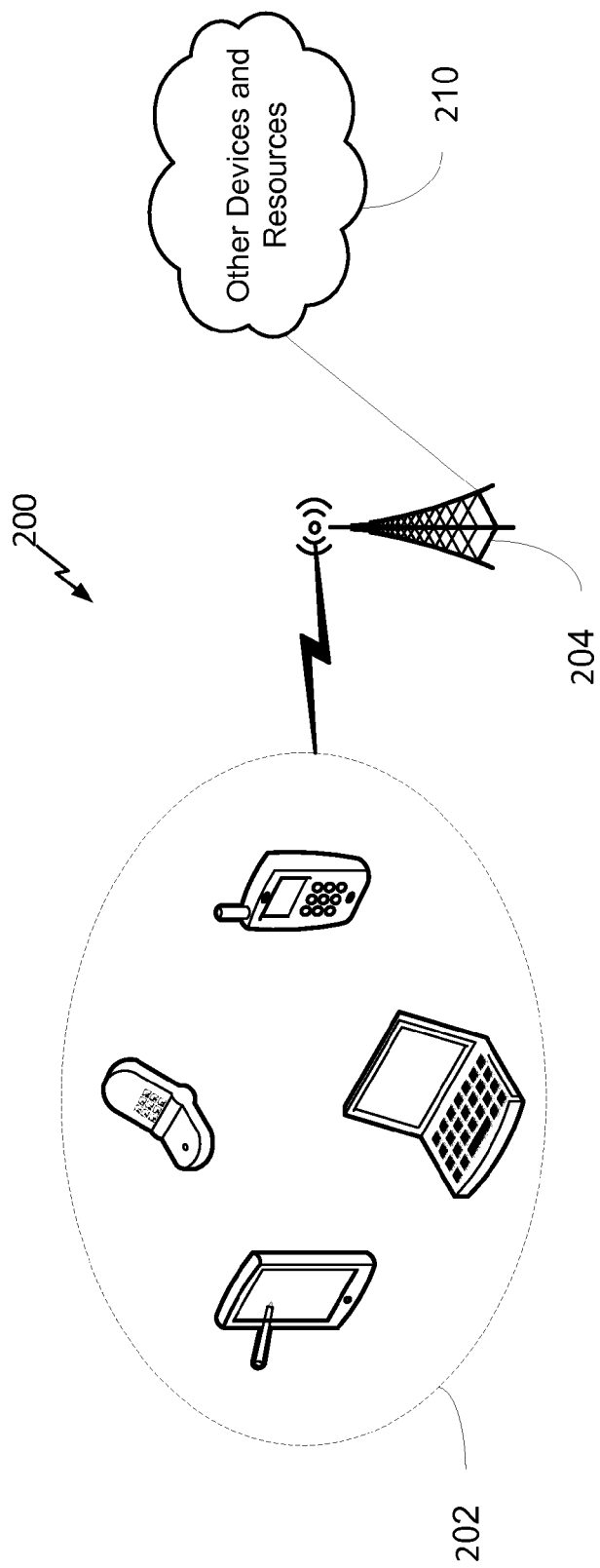
FIG. 2 is a block diagram illustrating an environment that includes a device according to various embodiments of the disclosure.

FIG. 2 is a block diagram illustrating an environment 200 that includes one or more devices 202. The environment 200 may be representative of any system(s) or a portion thereof that may include at least one wireless communication device 202 enabled to transmit and/or receive wireless signals to/from at least one wireless network 204. The device 202 may, for example, be a mobile device or a device that while movable is primarily intended to remain stationary. For example, the device may be a cellular phone, a smart phone, a personal digital assistant, a portable computing device, a navigation device, a tablet, etc. The device 202 may also be a stationary device (e.g., a desktop computer, machine-type communication device, etc.) enabled to transmit and/or receive wireless signals. In yet other aspects, the device 202 may take the form of one or more integrated circuits, circuit boards, and/or the like that may be operatively enabled for use in another device. Thus, as used herein, the terms "device" and "mobile device" may be used interchangeably as each term is intended to refer to any single device or any combinable group of devices that may transmit and/or receive wireless signals.

The wireless network 204 may, for example, be representative of any wireless communication system or network that may be enabled to receive and/or transmit wireless signals. By way of example but not limitation, the wireless network 204 may include one or more of a wireless wide area network (WWAN), a wireless local area network (WLAN), a wireless personal area network (WPAN), a wireless metropolitan area network (WMAN), a Bluetooth communication system, WiFi communication system, Global System for Mobile communication (GSM) system, Evolution Data Only/Evolution Data Optimized (EVDO) communication system, Ultra Mobile Broadband (UMB) communication system, Long Term Evolution (LTE) communication system, Mobile Satellite Service-Ancillary Terrestrial Component (MSS-ATC) communication system, and/or the like.

The wireless network 204 may be enabled to communicate with and/or otherwise operatively access other devices and/or resources as represented simply by cloud 210. For example, the cloud 210 may include one or more communication devices, systems, networks, or services, and/or one or more computing devices, systems, networks, or services, and/or the like or any combination thereof.

In various examples, the wireless network 204 may utilize any suitable multiple access and multiplexing scheme, including but not limited to Code Division Multiple Access (CDMA), Time Division Multiple Access (TDMA), Frequency Division Multiple Access (FDMA), Orthogonal Frequency Division Multiple Access (OFDMA), Single-Carrier Frequency Division Multiple Access (SC-FDMA), etc. In examples where the wireless network 204 is a WWAN, the network may implement one or more standardized radio access technologies (RATs) such as Digital Advanced Mobile Phone System (D-AMPS), IS-95, cdma2000, Global System for Mobile Communications (GSM), UMTS, eUTRA (LTE), or any other suitable RAT. GSM, UMTS, and eUTRA are described in documents from a consortium named "3rd Generation Partnership Project" (3GPP). IS-95 and cdma2000 are described in documents from a consortium named "3rd Generation Partnership Project 2" (3GPP2). 3GPP and 3GPP2 documents are publicly available. In examples where the wireless network 204 is a WLAN, the network may be an IEEE 802.11x (e.g., WiFi) network, or any other suitable network type. In examples where the wireless network 204 is a WPAN, the network may be a Bluetooth network, an IEEE 802.15x, or any other suitable network type.

The device 202 may include at least one radio (also referred to as a transceiver). The terms "radio" or "transceiver" as used herein refers to any circuitry and/or the like that may be enabled to receive wireless signals and/or transmit wireless signals. In particular aspects, two or more radios may be enabled to share a portion of circuitry and/or the like (e.g., a processing unit, memory, etc.). That is the terms "radio" or "transceiver" may be interpreted to include devices that have the capability to both transmit and receive signals, including devices having separate transmitters and receivers, devices having combined circuitry for transmitting and receiving signals, and/or the like.

In some aspects, the device 202 may include a first radio enabled to receive and/or transmit wireless signals associated with at least a first network of a wireless network 204 and a second radio that is enabled to receive and/or transmit wireless signals associated with at least a second network of the wireless network 204. In some aspects, the device 202 may include least one navigation system (e.g., a satellite positioning system and/or the like).

Figure 3:
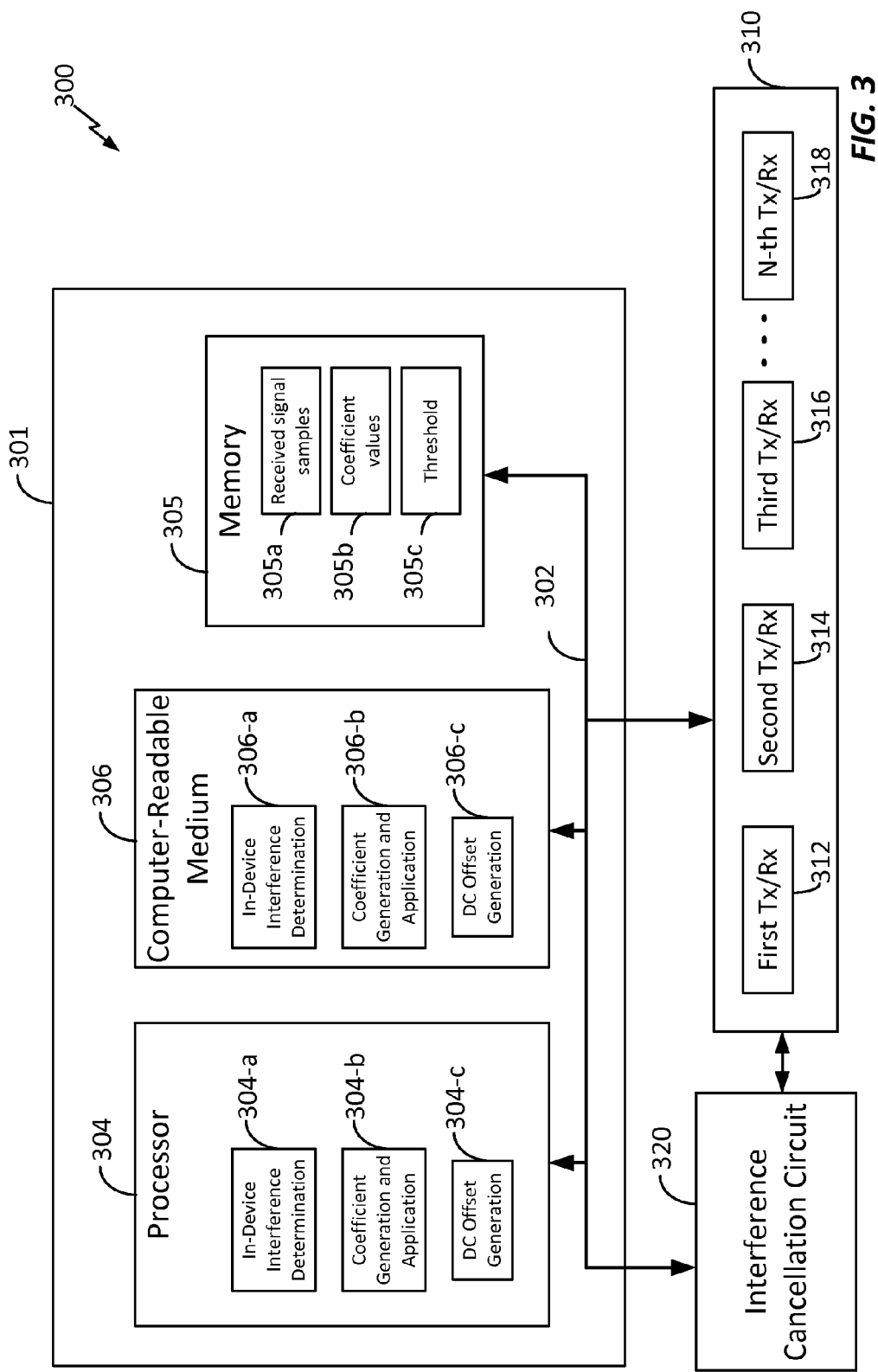
FIG. 3 is a block diagram of an illustrative hardware configuration for an apparatus employing a processing system according to various embodiments of the disclosure.

FIG. 3 is a block diagram of an illustrative hardware configuration for an apparatus 300 including a processing system 301, according to various aspects of the disclosure. For example, the apparatus 300 may be a wireless communication device as illustrated in any one or more of FIGS. 2, 4, 5, 6, and/or 7. In this example, the processing system 301 may be implemented with a bus architecture represented generally by bus 302. The bus 302 may include any number of interconnecting buses and bridges depending on the specific application of the processing system 301 and the overall design constraints. The bus 302 links together various circuits including one or more processors, represented generally by the processor 304, memory 305, and computer-readable media, represented generally by the computer-readable medium 306. The bus 302 may also link various other circuits such as timing sources, peripherals, voltage regulators, and power management circuits, which are well known in the art, and therefore, will not be described any further. The bus 302 may further link to a plurality of transmitters and/or receivers 310 and an interference cancellation (IC) circuit 320. Each of the Tx/Rx circuits 310 allows for transmitting to and/or receiving from various other apparatus over a transmission medium. The interference cancellation circuit 320 is described in further detail below.

The memory 305 may be used to store data or information. For example, the memory 305 may store data indicative of one or more samples of a received signal 305a. At least a portion of the samples may be composed of interference due to, e.g., an aggressor transmitter.

The memory 305 may store data indicative of one or more coefficients or coefficient values 305b that may be used to perform interference cancellation with respect to the received signal. The coefficients 305b may be in a digital format and may be configured to support conversion to an analog format as described further below.

The memory 305 may store data indicative of one or more threshold 305c. The threshold 305c may be used as a basis for controlling the adaptive filter and updating the coefficients 305b.

The processor 304 is responsible for managing the bus 302 and general processing, including the execution of software 307 (not shown) stored on computer-readable storage medium 306 and/or memory 305. Examples of processors 304 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. That is, the processor 304, as utilized in a processing system 301, may be used to implement any one or more of the processes described below and illustrated in FIGS. 10 and 11.

Figure 5:
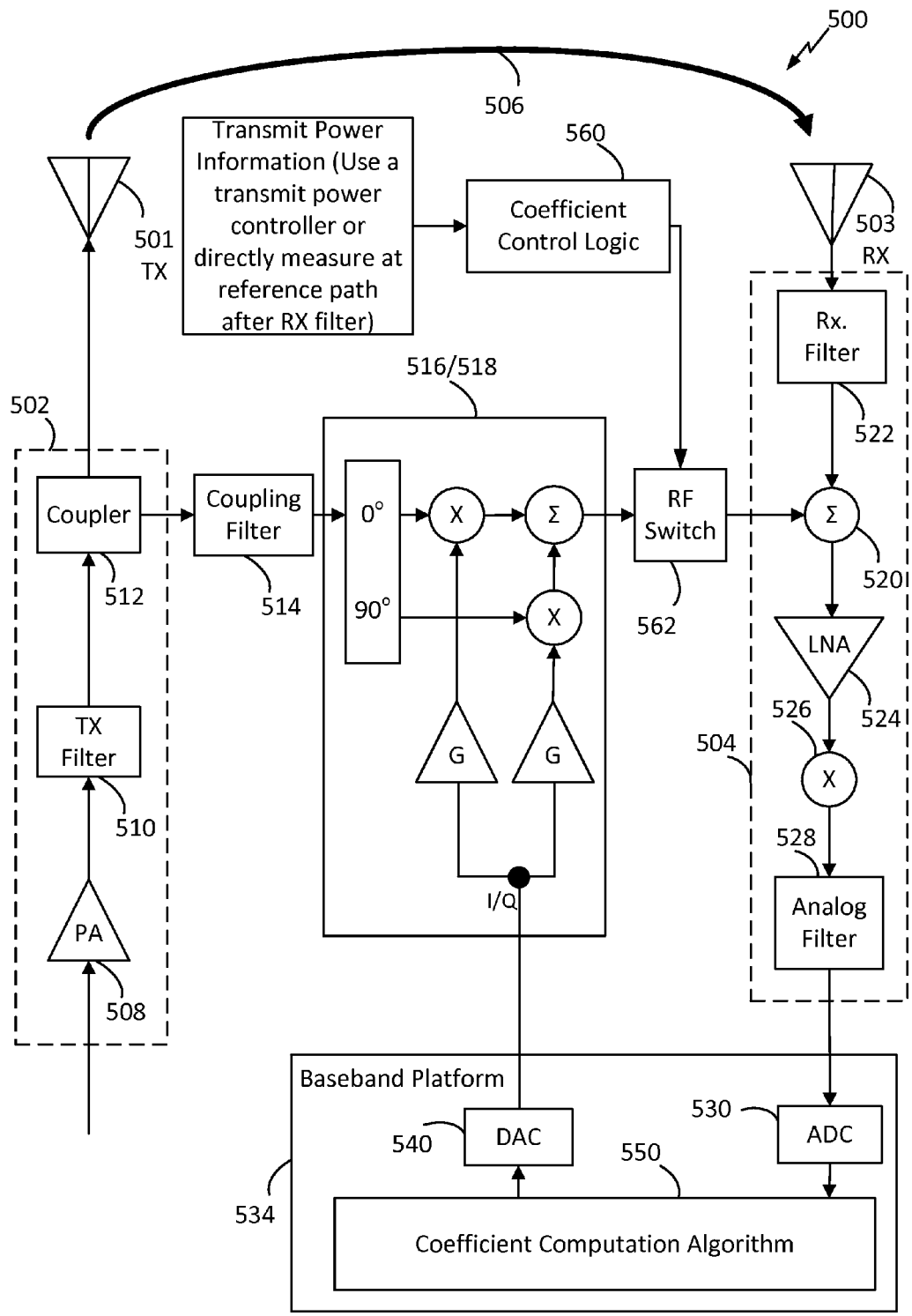
FIGS. 5-7 illustrate block diagrams of systems for performing interference cancellation according to various embodiments of the disclosure.

The processor 304 may include in-device interference determination circuitry 304-a configured to determine one or more characteristics of an interference signal affecting receive performance, including but not limited to a power level of an interfering signal output by an analog filter 528 (see FIG. 5). The processor 304 may further include coefficient generation and application circuitry 304-b configured to determine a digital coefficient for interference cancellation of an interfering signal based on a baseband signal, as well as applying the determined coefficient to an interference cancellation circuit to cancel the interfering signal. In various aspects, the processor 304 may further include DC offset generation circuitry 304-c configured to determine a DC offset to be applied to an interference cancellation circuit, e.g., in accordance with a baseband signal, with an aim to steer a cancellation center in accordance with characteristics of the interfering signal.

One or more processors 304 in the processing system 301 may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 306. The computer-readable medium 306 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 306 may reside in the processing system 301, external to the processing system 301, or distributed across multiple entities including the processing system 301. The computer-readable medium 306 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The computer-readable medium 306 may include in-device interference determination software 306-a configured to determine one or more characteristics of an interference signal affecting receive performance, including but not limited to a power level of an interfering signal output by an analog filter 528 (see FIG. 5). The computer-readable medium 306 may further include coefficient generation and application software 306-b configured to determine a digital coefficient for interference cancellation of an interfering signal based on a baseband signal, as well as applying the determined coefficient to an interference cancellation circuit to cancel the interfering signal. In various aspects, the computer-readable medium 306 may further include DC offset generation software 306-c configured to determine a DC offset to be applied to an interference cancellation circuit, e.g., in accordance with a baseband signal, with an aim to steer a cancellation center in accordance with characteristics of the interfering signal.

In various aspects, the apparatus 300 includes an interference cancellation (IC) circuit 320 configured to cancel in-device interference produced by the transceivers 310 that are operating on the same, adjacent, or harmonic/sub-harmonic frequencies. The processor 304 may adjust the settings of the IC circuit 320 to adjust the amplitude, phase, and/or delay of an input signal to generate an output.

Figure 4:
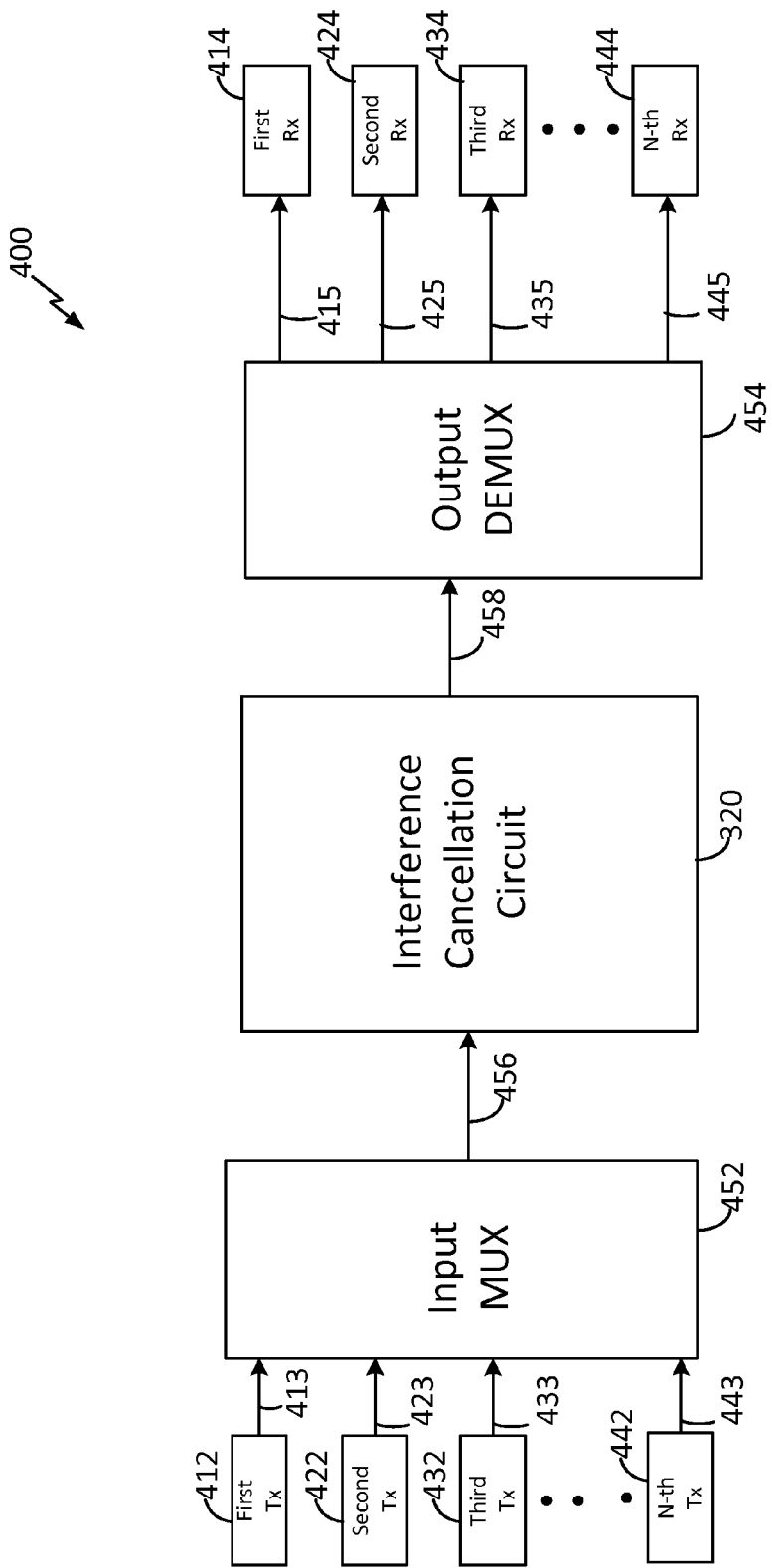
FIG. 4 is a block diagram of a wireless communication device having plural transmitters and plural receivers, according to various embodiments of the disclosure.

FIG. 4 is a block diagram illustrating a wireless communication device 400 (e.g., the apparatus 301 illustrated in FIG. 3) having plural transmitters and plural receivers, in accordance with some aspects of the present disclosure. At least a portion of the wireless communication device 400 may be implemented with the processing system 301 (e.g., see FIG. 3).

With reference to FIGS. 2-4, in various aspects, the plurality of Tx/Rx circuits 310 may include any suitable number of Tx/Rx circuits such as, for example (but not limited to) a first Tx/Rx circuit 312, a second Tx/Rx circuit 314, a third Tx/Rx circuit 316, to an n-th Tx/Rx circuit 318. The first Tx/Rx circuit 312 may include a first transmitter 412 and a first receiver 414. The second Tx/Rx circuit 314 may include a second transmitter 422 and a second receiver 424. The third Tx/Rx circuit 316 may include a third transmitter 432 and a third receiver 434. The n-th Tx/Rx circuit 318 may include an n-th transmitter 442 and an n-th receiver 444. Depending on which transmitters are active (e.g., transmitting) and which receivers are active (e.g., receiving), any number of co-existence issues may occur.

Each of the Tx/Rx circuits 310 may operate according to various parameters, such as a respective frequency, radio frequency circuits with group delays, coupling channel gains to other Tx/Rx circuits, and/or the like. For instance, the first Tx/Rx circuit 312 may operate at a first frequency f1 with a first delay d1, the second Tx/Rx circuit 314 may operate at a second frequency f2 with a second delay d2, the third Tx/Rx circuit 316 may operate at a third frequency f3 with a third delay d3, and the n-th Tx/Rx circuit 318 may operate at an n-th frequency fn with an n-th delay d2. The first Tx/Rx circuit 312 may have a coupling channel gain h12 to the second Tx/Rx circuit 314, a coupling channel gain h13 to the third Tx/Rx circuit 316, and a coupling channel gain h1n to the n-th Tx/Rx circuit 318, respectively. Other Tx/Rx circuits 310 may have different coupling channel gains to various Tx/Rx circuit 310.

In various aspects, the apparatus 301 is configured to reduce interference produced among Tx/Rx circuits of the plurality of Tx/Rx circuits 310, for example, operating on the same, adjacent, harmonic, or sub-harmonic frequencies. In particular aspects, the apparatus 301 is configured to be adaptable for different Tx/Rx circuit combinations. That is, the apparatus 301 is configured to cancel interference based on the co-existence issue caused by the current combination of Tx/Rx circuits 310. For instance, for a first co-existence issue (e.g., at time T1) caused by a first combination of Tx/Rx circuits 310, such as the first transmitter 412 (e.g., LTE transmitter) and the second receiver 424 (e.g., WiFi receiver), the apparatus 301 (e.g., via the processor 304) may select from among the transmitters and the receivers, the first transmitter 412 for providing an input to the IC circuit 320 and the second receiver 424 for receiving an output of the IC circuit 320. Accordingly, interference caused by an aggressor Tx/Rx circuit (e.g., the first transmitter 412) upon a victim Tx/Rx circuit (e.g., the second receiver 424) can be reduced. In this case, if the coupling channel gain from the aggressor Tx/Rx circuit to the victim Tx/Rx circuit is, for example, −10 dB (e.g., due to separation of two antennas), then the IC circuit 320 may need to match this gain for successful IC. For a second co-existence issue (e.g., at time T2) caused by a second (different) combination of Tx/Rx circuits, such as the first transmitter 412 (e.g., WiFi transmitter) and the third receiver 434 (e.g., LTE band 7), the apparatus 301 (e.g., via the processor 304) may select from among the transmitters and the receivers, the first transmitter 412 for providing an input to the IC circuit 320 and the third receiver 434 for receiving an output of the IC circuit 320. Accordingly, interference caused by an aggressor Tx/Rx circuit (e.g., the first transmitter 412) upon a victim Tx/Rx circuit (e.g., the third receiver 434) can be reduced. According to various aspects, in such a case, if the coupling channel gain from the aggressor Tx/Rx circuit to the victim Tx/Rx circuit is, for example, −50 dB (e.g., due to separation two antennas and band pass filtering at the victim Tx/Rx circuit), then the IC circuit 320 may need to match this gain for successful interference cancellation.

In various aspects, the device 400 may be configured to select the Tx/Rx circuits (e.g., one or more transmitters and one or more receivers) associated with a co-existence issue. In particular aspects, the processor 304 or the like selects the Tx/Rx circuits causing a co-existence issue for processing by the IC circuit 320, for example, in response to detection of the co-existence issue between the at least two Tx/Rx circuits. For instance, in some aspects, the transmitters 412, 422, 432, 442 may be coupled to an input multiplexer (MUX) 452 to receive corresponding signals 413, 423, 433, 443 from the transmitters 412, 422, 432, 442. The input multiplexer 452 is coupled to the IC circuit 320 to allow the input multiplexer 452 to select (e.g., as controlled by the processor 304) one of the signals 413, 423, 433, 443 from one of the transmitters 412, 422, 432, 442 as input signal 456 to the IC circuit 320.

The receivers 414, 424, 434, 444 may be coupled to an output multiplexer/demultiplexer (DEMUX) 454 to receive corresponding signals 415, 425, 435, 445 from the output multiplexer 454. The output multiplexer 454 is coupled to the IC circuit 320 to allow the output multiplexer 454 to select (e.g., as controlled by the processor 304) one of the receivers 414, 424, 434, 444 to receive an output signal 458 from the IC circuit 320.

For example, for a co-existence issue caused by a combination of Tx/Rx circuits, such as the first transmitter 412 (e.g., LTE transmitter) and the third receiver 434 (e.g., WiFi), the processor 304 may select from among the transmitters, the first transmitter 412 for providing the input signal 456 to the IC circuit 320, and the processor 304 may select from among the receivers, the third receiver 434 for receiving the output signal 458 from the IC circuit 320. Likewise, in response to detecting a different co-existence issue caused by a different combination of the Tx/Rx circuits 310, the processor 304 may select the Tx/Rx circuits causing the different co-existence issue. In some aspects, the processor 304 may activate the IC circuit 320, which may be deactivated or in a reduced power state, in response to detecting a co-existence issue.

Analog interference cancellation (AIC) in RF domain can prevent a receiver chain from excessive RF impairment when the interference at the receiver band is significantly high. In particular, in a multi-radio device, if one technology simultaneously transmits while another technology receives, the receiving technology can experience substantial interference and may even cause a de-sense, meaning data is lost at the receiver. For example, analog saturation can cause errors in the digital domain if the interference power is significantly higher than the noise floor. AIC can reduce or prevent this saturation.

However, AIC needs to be activated only when the receiver interference level is within a certain predefined range. Otherwise, it can inject additional noise to the receiver (if the interference level is too low), or the cancellation may be useless (if the interference level is too high). Controlling the analog interference cancellation is especially required when the interfering signal is based on time-division duplexing (TDD), where the interfering signal is on/off dynamically.

Referring now to FIG. 5, a block diagram of a system 500 for cancelling in-device interference between a transmitter 502 and a receiver 504 in accordance with some aspects of the disclosure is shown. The system 500 may be associated with one or more systems, devices, or components, such as the systems, devices, and components described above in connection with FIGS. 2-4. The system 500 includes a transmit antenna 501 and a receive antenna 503. For example, the transmitter 502 may be an aggressor transmitter selected from among the first, second, third, or n-th transmitters 412, 422, 432, or 442, and the receiver 504 may be a victim receiver selected from among the first, second, third, or n-th receivers 414, 424, 434, or 444.

That is, the transmitter 502 may be the aggressor, generating or causing in-device interference in connection with an interfering signal 506 received by the victim receiver 504. The aggressor transmitter 502 and victim receiver 504 may be part of the same device (e.g., the apparatus 301). Moreover, while a single transmitter 502 and a single receiver 504 are shown, more than one transmitter 502 and/or more than one receiver 504 may be provided in accordance with aspects of the disclosure.

Associated with, or coupled to, the transmitter 502 may be a power amplifier (PA) 508 and a TX filter 510. These components are well-known in the art and so a further description is omitted for the sake of brevity. The PA 508 may receive a signal or data for transmission by the TX 502.

The transmitter 502 may be associated with a coupler 512. The coupler 512 may be used to provide, potentially via a coupling filter 514 (e.g., bandpass filter (BPF)), a reference signal r(t), which may correspond to some portion or function of the signal transmitted by the transmitter 502, to an AIC circuit 516. The AIC circuit 516 may in some examples include a one-tap least mean squares (LMS) adaptive filter 518. Broadly, the AIC circuit 516 may be configured to generate an output signal that matches the interfering signal 506 as closely as possible, such that the AIC output can be combined with the interfering signal 506 in a destructive fashion to cancel the in-device interference signal.

Coefficient control logic 560 may be implemented at RF, in conjunction with an RF switch 562. Transmit power information (e.g., including aggressor power level) may be derived, for example, from a transmit power controller or from a direct measurement at the reference path, for example, after the coupling filter 514. The PA output power is controlled by the transmit power controller, so the transmit power level and the amount of leakage seen by the receive band can be obtained by observing the transmit power controller. The derived transmit power information is inputted to the coefficient control logic 560. The coefficient control logic 560 may detect the RF energy from the transmitter 502 to provide a measurement of the aggressor power level. The aggressor power level measurement may then be used to activate the RF switch 562 when the measurement exceeds a first threshold. With the RF switch 562 engaged, the output of the AIC circuit 516 is sent to the adder 520 to cancel interfering signal 506.

Alternately, if the measurement of the aggressor power level is less than the first threshold, then the RF switch 562 is not turned on or is disengaged (if previously on). When the RF switch 562 is disengaged, the output from the AIC circuit 516 is blocked from the adder 520. With the RF switch 562 disengaged, noise from the AIC circuit 516 is blocked from being inputted to the adder 520. By the use of the RF switch 562, when the transmitter 502 is off or when the aggressor power level is less than the first threshold, noise from the AIC circuit 516 is blocked. The coefficient control logic 560 may incorporate one or more aggressor transmitter features to either activate or disengage the RF switch 562. For example, the aggressor transmitter features may include aggressor transmitter state, transmit start time, transmit stop time, transmit power level, nonlinear characteristics of the aggressor transmitter, frequency separation between the aggressor transmitter (e.g., transmitter 502) and victim receiver (e.g., receiver 504).

The AIC circuit 516 may be configured to generate an output that may be supplied as a first input to a combiner, integrator, or adder 520. A second input to the adder 520 may correspond to the interfering signal 506 received by the receiver 504, as potentially subject to a receiver filter 522 (e.g., bandpass filter (BPF)).

The adder 520 may be configured to combine its first and second inputs in order to generate an output that is provided to a low-noise amplifier (LNA) 524. For example, the adder 520 may be configured to subtract its first input (e.g., the output from the AIC circuit 516) from its second input (e.g., the output of the receiver filter 522). Ideally, with a perfect selection of (LMS) adaptive filter coefficients, the signal provided at the first input of the adder 520 is equal to the interference associated with the interfering signal 506, such that the interference is removed in the signal provided to the LNA 524. In this respect, the path from the coupler 512, through the coupling filter 514, to the AIC circuit 516 may serve as a reference path in order to provide a reference signal r(t).

The system 500 may provide for the coupling filter 514 in the reference signal path and the receiver filter 522 coupled to the receiver antenna to have substantially the same filter characteristics. That is, filtering both signals in substantially the same way can help ensure that any timing mismatch between the reference signal r(t) and the interfering signal 506 is reduced or eliminated.

In various aspects of the disclosure, as described in further detail below, the AIC circuit 516 may utilize, as an input to its interference cancellation function, coefficients and/or offsets that are not directly based on the RF output signal y(t) that is output from the LNA 524, but rather, the coefficients and/or offsets are based on the received signal after it is converted into a baseband signal. That is, a coefficient computation algorithm 550 may generate one or more coefficients to apply to the AIC circuit 516 based on a baseband signal.

That is, the output y(t) from the LNA 524 may be provided to a mixer 526. The mixer 526 then converts the output y(t) from the LNA 524 from a first signal domain or frequency (e.g., radio frequency or RF) to a second signal domain or frequency (e.g., baseband). Here, a baseband signal may include an unmodulated signal, a lowpass signal, or a signal at relatively low frequencies, in some examples corresponding to an audible range (e.g., up to 20 kHz). While not shown in FIG. 5, the mixer 526 may receive a signal from an oscillator (e.g., a voltage-controlled oscillator (VCO)) in order to provide the conversion to baseband.

The output baseband signal from the mixer 526 is provided to an analog filter 528. The filter 528 may serve as an anti-aliasing filter prior to analog-to-digital conversion. The output of the filter 528 is provided to an analog-to-digital converter (ADC) 530. The coefficient computation algorithm 550 in the baseband platform 534 computes the coefficients directly or indirectly (e.g., after digital filtering) from digital samples of the baseband signal output from the ADC 530. In some examples, the coefficient computation algorithm 550 may be implemented by the processor 304 of FIG. 3.

In accordance with some aspects of the disclosure, the baseband platform 534 is configured to generate and output coefficients (e.g., LMS coefficients) to the AIC circuit 516. For ease of description, when utilized in the present disclosure, the output of the coefficient computation algorithm 550 may be referred to simply as coefficients. However, this is to be understood to include not only LMS coefficient(s), but in some examples, may also include DC offset value(s).

In further aspects of the disclosure, the output of the coefficient computation algorithm 550 may be in a digital format. Here, the digital output of the coefficient control algorithm 550 may be provided to a digital-to-analog converter (DAC) 540. The output of the DAC 540 may then be provided to the AIC circuit 516.

One or more of the components 530, 540, 550 (e.g., those in baseband platform 534), potentially in combination with at least a portion of the mixer 526 and the analog filter 528, may serve as an automated coefficient generator. The coefficient generator may be operative on the basis of having observed the interfering signal 506 after its conversion to baseband. In some examples, coefficient generation can be conducted at RF or at baseband. In other examples, coefficient generation can be conducted partially at baseband in combination with analog LMS adaptive filter.

Figure 6:
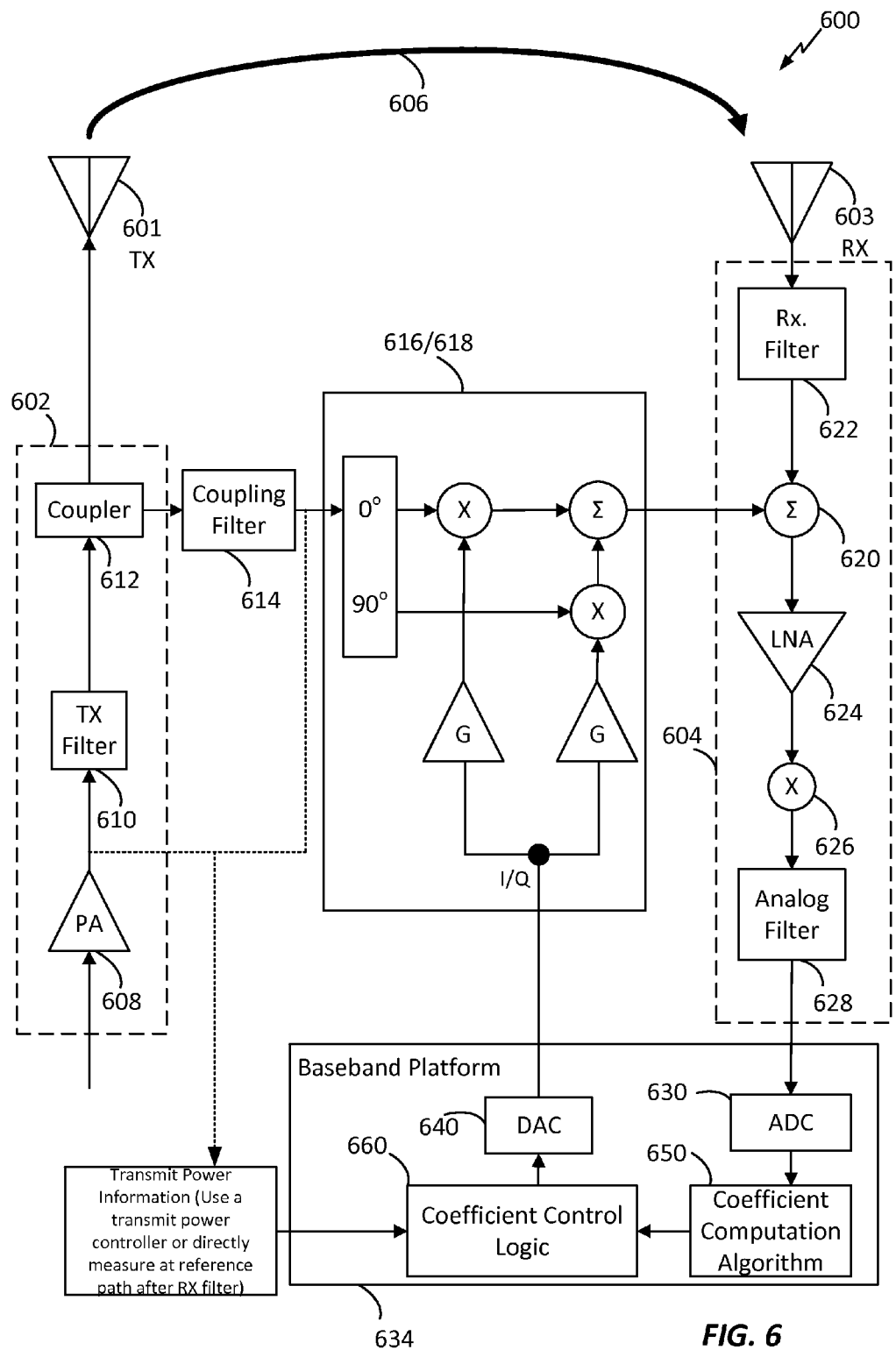

Referring now to FIG. 6, a block diagram of an in-device interference cancellation system 600 in accordance with some aspects of the disclosure is shown. The system 600 illustrates an example of in-device interference cancellation conducted partially at baseband (e.g., coefficient control logic being implemented at baseband) in combination with an analog interference cancellation (AIC) circuit.

The system 600 includes many similar components described above in connection with the system 500 of FIG. 5. The following components are included in system 600: transmit antenna 601, transmitter 602, power amplifier (PA) 608 and a TX filter 610, coupler 612, coupling filter 614, analog interference cancellation (AIC) circuit 616 which includes a one-tap least mean squares (LMS) adaptive filter 618, receive antenna 603, receiver 604, receiver filter 622, adder 620, low-noise amplifier (LNA) 624, mixer 626, analog filter 628, analog-to-digital converter (ADC) 630, coefficient computation algorithm 650, digital-to-analog converter (DAC) 640, coefficient control logic 660, baseband platform 634. In various representative aspects, the AIC circuit 616 includes a plurality of taps and/or LMS adaptive filters. In various aspects, the coefficient control logic 660 is baseband centric. That is, it is implemented as part of the baseband platform 634. Description and functionalities of similar components will not be repeated here.

In system 600, the output from the AIC circuit 616 is disengaged from being inputted to the receiver 604 by the coefficient control logic 660 which is implemented at baseband, and not by an RF switch. The coefficient control logic 660 measures interference metrics, based on transmit power information. Transmit power information (e.g., including aggressor power level) may be derived, for example, from a transmit power controller or from a direct measurement at the reference path, for example, after the coupling filter 514. The PA output power is controlled by the transmit power controller, so the transmit power level and the amount of leakage seen by the receive band can be obtained by observing the transmit power controller. The coefficient control logic 660 may detect the RF energy from the transmitter 602 to provide a measurement of the aggressor power level. The coefficient control logic 660 may compare the measurement of the aggressor power level to a plurality of thresholds to determine the state of the coefficient update.

In various aspects, the plurality of thresholds may be based on one or more aggressor transmitter features such as aggressor transmitter state, transmit start time, transmit stop time, transmit power level, nonlinear characteristics of the aggressor transmitter, frequency separation between the aggressor transmitter (e.g., transmitter 602) and victim receiver (e.g., receiver 604).

In various aspects, the transmit power information may be derived from other measurements at, for example, the power amplifier (PA) 608 output, the coupling filter 614 output, the LNA 624 output, the ADC 630 input, the ADC 630 output, etc. In various aspects, the transmit power information may be derived by measuring reference signal level from the coefficient control logic 660. In various aspects, the coefficient control logic 660 measures other interference metrics such as interference-to-noise ratio (INR), received signal strength indication (RSSI), bit error rate (BER), signal-to-interference and noise ratio (SINR), etc. based on the ADC 630 output samples. In some examples, the interference metrics may be digitally filtered (e.g., using an infinite impulse response (IIR) filter or a finite impulse response (FIR) filter) for smoothing (i.e., averaging) of the measurements.

In various aspects, two thresholds are used to determine coefficient update states: UPDATE (a.k.a. ON state), FREEZE, or OFF by the coefficient control logic 660. If the measurement of the aggressor power level is greater than a first threshold, the coefficient update state is on (i.e., on UPDATE state). In the UPDATE state, updated coefficients from the coefficient computation algorithm 650 are applied to the AIC circuit 618.

If the measurement of the aggressor power level is less than a second threshold, the coefficient update state is OFF. In various aspects, the second threshold is less in value than the first threshold. In the OFF state, ZERO coefficients (i.e., the values of the coefficients are zeros) from the coefficient computation algorithm 650 are applied to the AIC circuit 618.

If the measurement of the aggressor power level is greater than the second threshold but less than the first threshold, the coefficient update state is FREEZE. In the FREEZE state, coefficients from the coefficient computation algorithm 650 are not updated ("frozen coefficients"), but are still applied to the AIC circuit 618. In various aspects, the "frozen" coefficients are only applied to the AIC circuit 618 for a freeze time period from when the "frozen" coefficients were generated. After that freeze time period expires, the "frozen" coefficients would not be considered valid for application and the coefficient update state is set to OFF.

Figure 7:
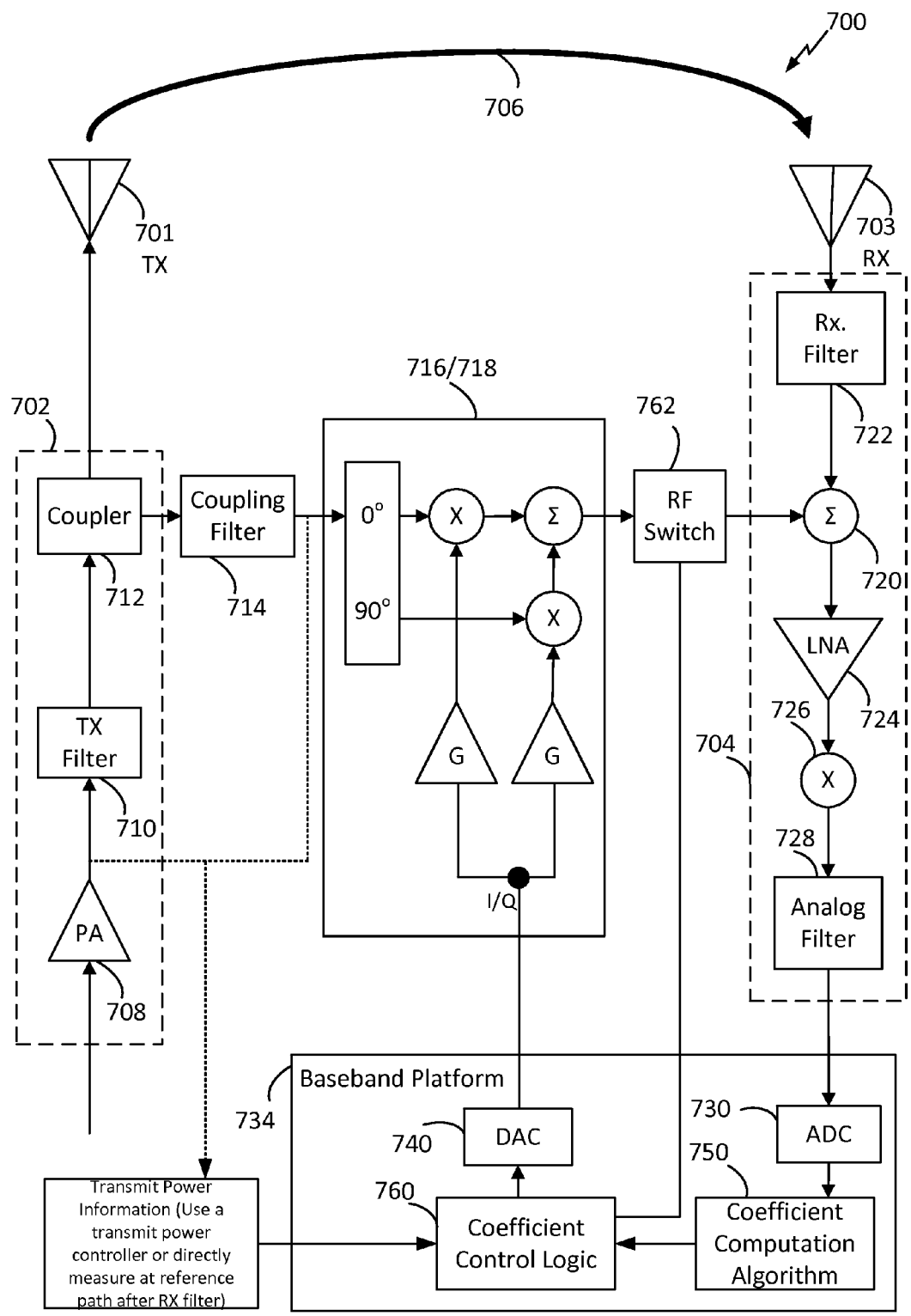

Referring now to FIG. 7, a block diagram of a system 700 for cancelling in-device interference between a transmitter 702 and a receiver 704 in accordance with some aspects of the disclosure is shown. System 700 includes an RF switch 762 that can physically disconnect the AIC circuit from the receiver, and a coefficient control logic 760 implemented as part of the baseband platform 734.

The system 700 includes many similar components described above in connection with the system 500 of FIG. 5. The following components are included in system 700: transmit antenna 701, transmitter 702, power amplifier (PA) 708 and a TX filter 710, coupler 712, coupling filter 714, analog interference cancellation (AIC) circuit 716 which includes a one-tap least mean squares (LMS) adaptive filter 718, RF switch 762, receive antenna 703, receiver 704, receiver filter 722, adder 720, low-noise amplifier (LNA) 724, mixer 726, analog filter 728, analog-to-digital converter (ADC) 730, coefficient computation algorithm 750, digital-to-analog converter (DAC) 740, coefficient control logic 760, baseband platform 734. In various representative aspects, the AIC circuit 716 includes a plurality of taps and/or LMS adaptive filters. In various aspects, the coefficient control logic 760 is baseband centric. That is, it is implemented as part of the baseband platform 734. Description and functionalities of similar components will not be repeated here.

In system 700, the RF switch 762 is controlled by the coefficient control logic 760. In various aspects, the coefficient control logic 760 may incorporate one or more aggressor transmitter features to either activate or disengage the RF switch 562. For example, the aggressor transmitter features may include aggressor transmitter state, transmit start time, transmit stop time, transmit power level, nonlinear characteristics of the aggressor transmitter, frequency separation between the aggressor transmitter (e.g., transmitter 702) and victim receiver (e.g., receiver 704).

With the RF switch 762 engaged, the output of the AIC circuit 716 is sent to the adder 720 to cancel interfering signal 706. When the RF switch 762 is disengaged, the output from the AIC circuit 716 is blocked from the adder 720. With the RF switch 762 disengaged, noise from the AIC circuit 716 is blocked from being inputted to the adder 720.

The coefficient control logic 760 measures interference metrics, based on transmit power information. Transmit power information (e.g., including aggressor power level) may be derived, for example, from a transmit power controller or from a direct measurement at the reference path, for example, after the coupling filter 514. The PA output power is controlled by the transmit power controller, so the transmit power level and the amount of leakage seen by the receive band can be obtained by observing the transmit power controller. The coefficient control logic 760 may detect the RF energy from the transmitter 702 to provide a measurement of the aggressor power level. The coefficient control logic 760 may compare the measurement of the aggressor power level to a plurality of thresholds to determine the state of the coefficient update. In various aspects, the plurality of thresholds may be based on one or more aggressor transmitter features such as aggressor transmitter state, transmit start time, transmit stop time, transmit power level, nonlinear characteristics of the aggressor transmitter, frequency separation between the aggressor transmitter (e.g., transmitter 702) and victim receiver (e.g., receiver 704).

In various aspects, the transmit power information may be derived from other measurements at, for example, the power amplifier (PA) 708 output, the coupling filter 714 output, the LNA 724 output, the ADC 730 input, the ADC 730 output, etc. In various aspects, the transmit power information may be derived by measuring reference signal level from the coefficient control logic 760. In various aspects, the coefficient control logic 760 measures other interference metrics such as interference-to-noise ratio (INR), received signal strength indication (RSSI), bit error rate (BER), signal-to-interference and noise ratio (SINR), etc. based on the measurement of the aggressor power level. In some examples, the interference metrics may be digitally filtered (e.g., using an infinite impulse response (IIR) filter or a finite impulse response (FIR) filter) for smoothing (i.e., averaging) of the measurements.

In various aspects, two thresholds are used to determine coefficient update states: UPDATE (a.k.a. ON state), FREEZE, or OFF by the coefficient control logic 760. If the measurement of the aggressor power level is greater than a first threshold, the coefficient update state is on (i.e., on the UPDATE state). In the UPDATE state, updated coefficients from the coefficient computation algorithm 750 are applied to the AIC circuit 718. Here, the RF switch 762 is engaged.

If the measurement of the aggressor power level is less than a second threshold, the coefficient update state is OFF. In various aspects, the second threshold is less in value than the first threshold. In the OFF state, the RF switch 762 is not turned on or is disengaged (if previously on). When the RF switch 762 is disengaged, the output from the AIC circuit 716 is blocked from the adder 720.

If the measurement of the aggressor power level is greater than the second threshold but less than the first threshold, the coefficient update state is FREEZE. In the FREEZE state, coefficients from the coefficient computation algorithm 750 are not updated ("frozen coefficients"), but are still applied to the AIC circuit 718. Here, the RF switch 762 is engaged. In various aspects, the "frozen" coefficients are only applied to the AIC circuit 718 for a freeze time period from when the "frozen" coefficients were generated. After that freeze time period expires, the "frozen" coefficients would not be considered valid for application and the coefficient update state is set to OFF.

The aggressor power level measurement may then be used to activate the RF switch 762 when the measurement exceeds a second threshold (i.e., in either the UPDATE state or FREEZE state). With the RF switch 762 engaged, the output of the AIC circuit 716 is sent to the adder 720 to cancel interfering signal 706.

Figure 8:
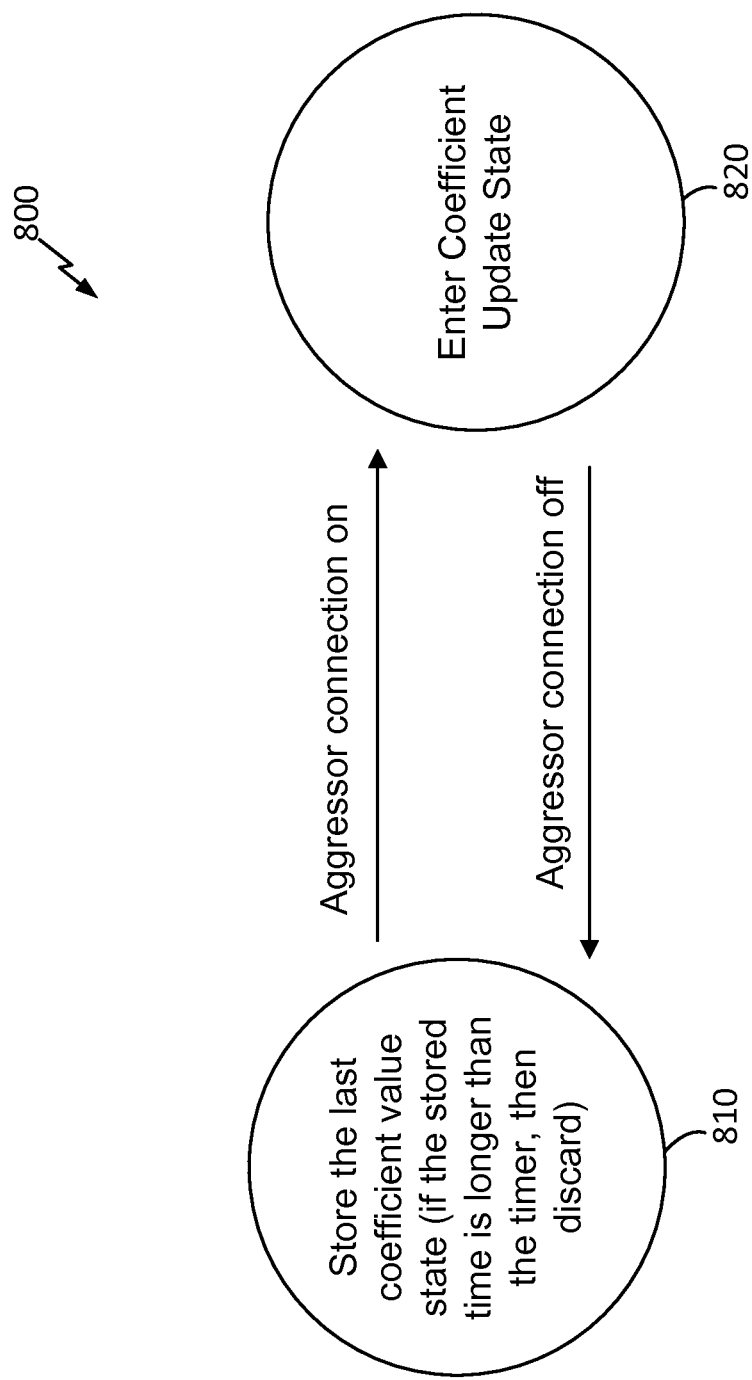
FIG. 8 illustrates an outer control logic implemented in the coefficient control logic via a state diagram with two states in accordance with some aspects of the disclosure.
Figure 9:
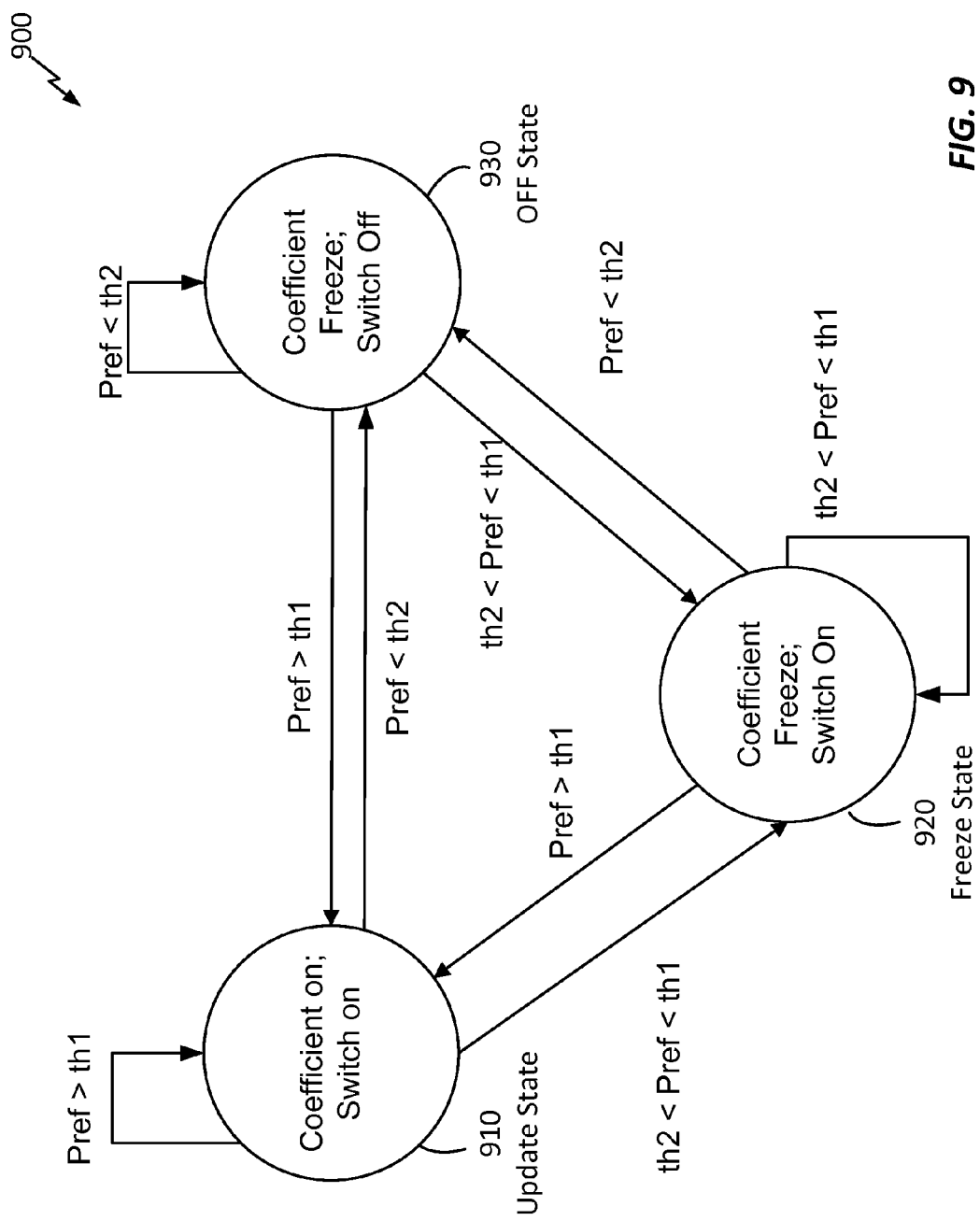
FIG. 9 illustrates an inner control logic implemented in the coefficient control logic via a state diagram with three states in accordance with some aspects of the disclosure.

FIG. 8 illustrates an outer control logic 800 implemented in the coefficient control logic 560, 660, 760 via a state diagram with two states in accordance with some aspects of the disclosure. The initial state of the outer control logic 800 is based on estimated aggressor connection activity derived from, for example, transmit power information. If the estimated aggressor connection activity is determined to be "aggressor connection on", then the initial state of the outer control logic 800 is set to a "Enter Coefficient Update" state 820. (Subsequent control logic states from state 820 are illustrated in FIG. 9.) If the estimated aggressor connection activity is determined to be "aggressor connection off", then the initial state of the outer control logic 800 is set to "Store the Last Coefficient Value" state 810. That is, the last coefficients are stored and the LMS adaptive filter within the AIC circuit 516, 616, 716 is turned off. In various examples, if the time duration of the "aggressor connection off" state is greater than a threshold ("off-time threshold"), then the stored coefficients are flushed, i.e., set to zero.

FIG. 9 illustrates an inner control logic 900 implemented in the coefficient control logic 560, 660, 760 via a state diagram with three states in accordance with some aspects of the disclosure. Regarding the inner control logic 900, if the reference power (Pref) is greater than a first threshold (th1), then enter the "update state" 910. In the "update state" 910, the coefficients are updated and the RF switch, if implemented, is switched ON to allow output from the AIC circuit 516, 616, 716 to be inputted to the adder 520, 620, 720 of the receiver 504, 604, 704. As long as the reference power is greater than the first threshold (Pref>th1), remain in the "update state" 910. If the reference power is less than a second threshold (th2), then enter an "OFF state" 930. In various examples, the coefficients are computed to maximize the cancellation of the aggressor TX observed in the receiver band. The amount of cancellation may be measured or estimated from the output signal of the ADC 730 at the receiver. Updating the coefficients may include finding the updated direction to minimize the signal power at the output of the ADC, for example, as disclosed in U.S. patent application Ser. No. 14/459,595, titled "AUTOMATED BLIND COEFFICIENT CONTROL IN ANALOG ACTIVE INTERFERENCE CANCELLATION" and filed on Aug. 14, 2014, which is incorporated herein by reference.

If the reference power (Pref) becomes less than the first threshold (th1) but greater than a second threshold (th2), then enter the "FREEZE state" 920. That is, enter the "FREEZE state" 920 if th2<Pref<th1. In various aspects, the first threshold (th1) is greater than the second threshold (th2). In the "FREEZE state" 920, the coefficients are frozen (i.e., not updated) and the RF switch, if implemented, is switched ON to allow output from the AIC circuit 516, 616, 716 to be inputted to the adder 520, 620, 720 of the receiver 504, 604, 704. As long as th2<Pref<th1 is true, remain in the "FREEZE state" 920.

If the reference power becomes greater than the first threshold (Pref>th1), while in the "FREEZE state" 920, then enter the "UPDATE state" 910. While in the "FREEZE state" 920, if the reference power becomes less than the second threshold (Pref<th2), then enter the "OFF state" 930. In the "OFF state" 930, the coefficients are frozen (i.e., not updated) and the RF switch, if implemented, is switched off That is, the AIC circuit output 516, 616, 716 is disconnected from the receiver 504, 604, 704. As long as reference power is less than the second threshold (Pref<Th2) while in the "OFF state" 930, remain in the "OFF state" 930. If the reference power becomes greater than the first threshold (Pref>Th1), then enter the "UPDATE state" 910. If the reference power is less than the first threshold (th1) and greater than the second threshold (th2), then enter the "FREEZE state" 920.

While in the "FREEZE state" 920, after the expiration of a freeze state timer (i.e., the coefficient is outdated), flush the coefficients to zero and enter the "OFF state" 930. In various aspects, the freeze state timer starts upon entry into the "FREEZE state" 920 and the expiration of the freeze state timer occurs then the timer value reaches a predetermined threshold ("freeze state timer threshold").

In various examples, the inner control logic 900 illustrated in FIG. 9 may be applied in the case where an RF switch is not implemented, for example, in the case illustrated in FIG. 6. Here, the function of the RF switch is replaced by using the coefficient values implemented by the coefficient computation algorithm 650, for example, by setting the coefficient values to zero.

Figure 10:
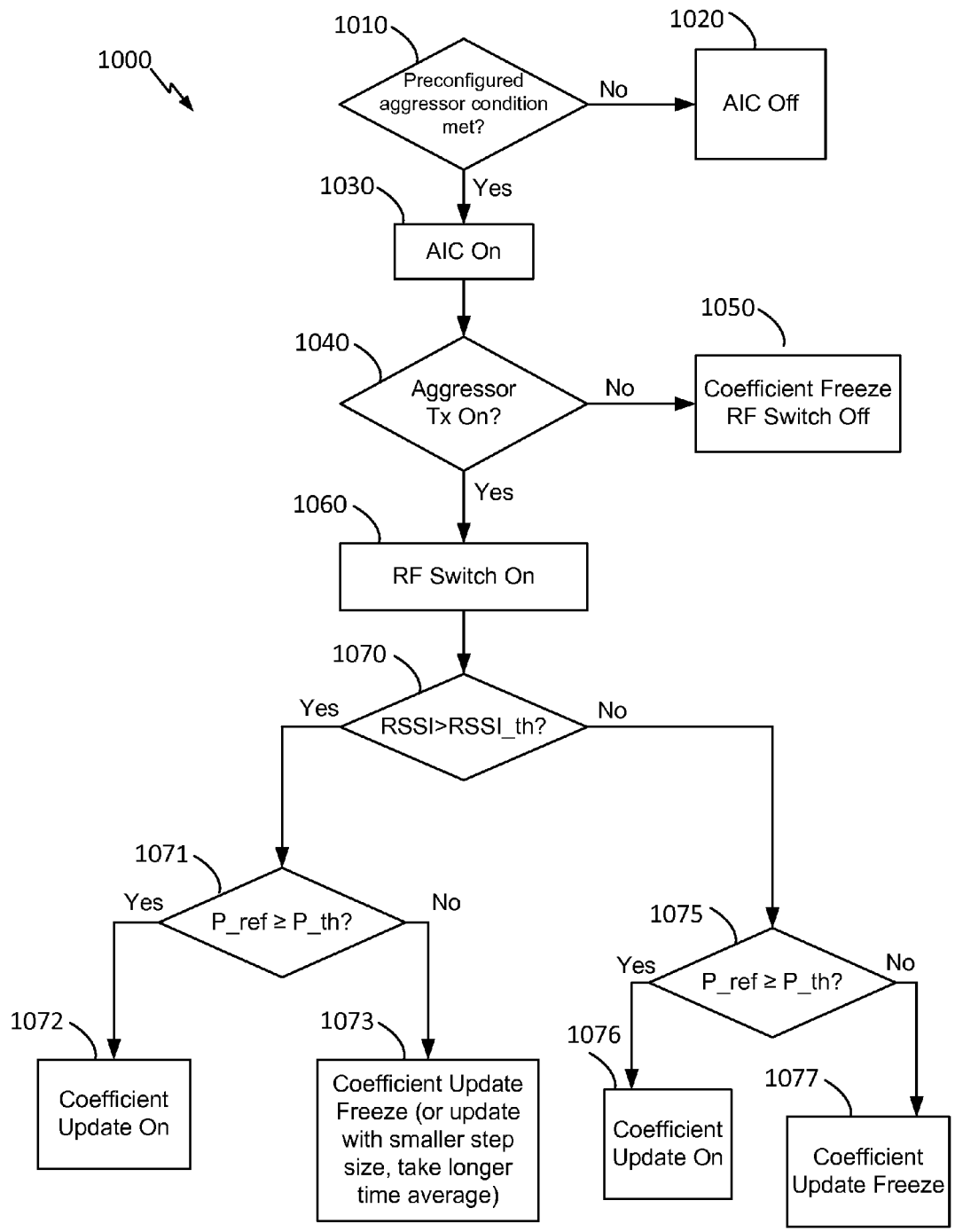
FIG. 10 illustrates a flow diagram for multi-layer coefficient control for dynamic interference cancellation in accordance with some aspects of the disclosure.

FIG. 10 illustrates a flow diagram 1000 for multi-layer coefficient control for dynamic interference cancellation in accordance with some aspects of the disclosure. The method 1000 may be tied to, or executed by, one or more systems, devices, or components. For example, the method 1000 may be executed by one or more of the systems, devices, or components described herein, as detailed above in connection with FIGS. 2, 3, 4, 5, 6, and/or 7. The method 1000 may provide interference cancellation (e.g., in-device interference cancellation) in a wireless communication device having at least one transmitter and at least one receiver. For example, the method 1000 may be used to provide analog interference cancellation using a one-tap LMS adaptive filter, or any of the analog interference cancellation circuits described above and illustrated, e.g., in FIGS. 5, 6 and/or 7.

In block 1010, determine if a preconfigured aggressor transmitter condition is met. Examples of the preconfigured aggressor transmitter condition may include aggressor transmitter state, transmit start time, transmit stop time, transmit power level, nonlinear characteristics of the aggressor transmitter, frequency separation between the aggressor transmitter and victim receiver.

In various examples, the preconfigured aggressor transmitter condition is met if it is determined that the aggressor transmitter is generating an interfering signal to the victim receiver. If the condition is not met, proceed to block 1020 and place the Analog interference cancellation (AIC) circuit in an OFF state (i.e., analog interference cancellation is disabled). If yes (i.e., the condition is met), proceed to block 1030 and place the AIC circuit in an UPDATE state (i.e., analog interference cancellation is enabled).

In block 1040, determine if an aggressor transmitter is on. If no, proceed to block 1050 and place the AIC circuit in a FREEZE state (and set the RF switch, if implemented, to off). In this configuration of freezing the coefficients, this means to not update the coefficients and to use the previous coefficients rather than obtaining new ones. In various examples, a predefined time duration is set for using the previous coefficients, after which, the previous coefficients are determined to no longer be valid for usage.

If yes, proceed to block 1060 and set the RF switch ON. In block 1070, determine if a received signal strength indication (RSSI) exceeds a RSSI threshold (RSSI_th). If yes, proceed to block 1071 and determine if a reference power (P_ref) exceeds a threshold (P_th). If yes, proceed to block 1072 and place the AIC circuit in an UPDATE state. In the UPDATE state, coefficients are updated. If no, proceed to block 1073 and place the AIC circuit in a FREEZE state. In various examples, placing the AIC circuit in this FREEZE state can include not updating the coefficients or updating the coefficient with a smaller step size (i.e., taking longer time average.)

Going back to block 1070, if the received signal strength indication (RSSI) does not exceed the RSSI threshold (RSSI_th), proceed to block 1075 and determine if a reference power (P_ref) exceeds a threshold (P_th). In various examples, the reference power (P_ref) in block 1071 refers to the same the reference power (P_ref) in block 1075. In various examples, the threshold (P_th) in block 1071 refers to the same the threshold (P_th) in block 1075. If yes, proceed to block 1076 and place the AIC circuit in an UPDATE state to update the coefficients. If no, proceed to block 1077 and place the AIC circuit in a FREEZE state to not update the coefficients and to use the previous coefficients rather than obtaining new ones. In various examples, a predefined time duration is set for using the previous coefficients, after which time duration, the previous coefficients are determined to no longer be valid for usage. In various examples, the RSSI threshold is based on the received signal power measured at the output of the ADC 730, which may include a desired signal power level and the aggressor power level. In contrast, the threshold (P_th) is based on the aggressor power level.

In accordance with aspects of the disclosure, the method 1000 may correspond to an algorithm used to perform interference cancellation. The structure/components described above represent means that may be used for performing such interference cancellation. In various aspects, an apparatus for performing interference cancellation includes one or more of the following: a processor; a memory coupled to the processor; a transmitter coupled to the processor; a receiver coupled to the processor; and an interference cancellation circuit coupled between the transmitter and the receiver with the processor configured to perform one or more of steps identified in the blocks of FIG. 10.

Figure 11:
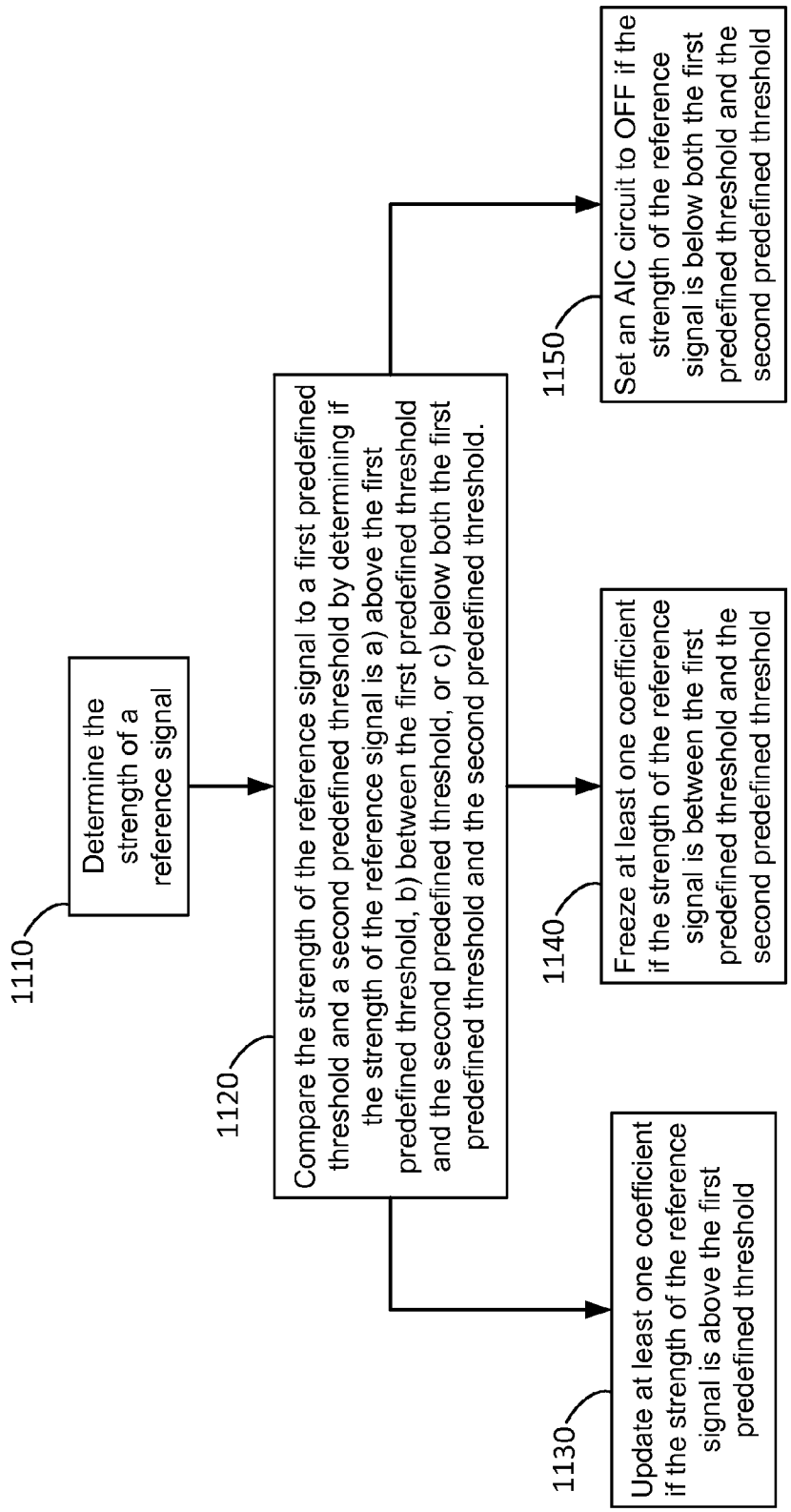
FIG. 11 illustrates a flow diagram for performing dynamic interference cancellation in a communication device having at least one transmitter and at least one receiver in accordance with some aspects of the disclosure.

FIG. 11 illustrates a flow diagram 1100 for performing dynamic interference cancellation in a communication device having at least one transmitter and at least one receiver in accordance with some aspects of the disclosure. The method 1100 may be tied to, or executed by, one or more systems, devices, or components. For example, the method 1100 may be executed by one or more of the systems, devices, or components described herein, as detailed above in connection with FIGS. 2, 3, 4, 5, 6, and/or 7. The method 1100 may provide interference cancellation (e.g., in-device interference cancellation) in a wireless communication device having at least one transmitter and at least one receiver. For example, the method 1100 may be used to provide analog interference cancellation using a one-tap LMS adaptive filter, or any of the analog interference cancellation circuits described above and illustrated, e.g., in FIGS. 5, 6 and/or 7.

In block 1110, determine the strength of a reference signal. In various aspects, the reference signal is measured at a point between the output of the coupling filter 514, 614, 714 and the input to the AIC circuit 516, 616, 716. In various aspects, the reference signal is measured from a. a transmit power controller or from a direct measurement at the reference path, for example, after the coupling filter 514, 614, 714. In various examples, the strength of the reference signal may correspond to the transmit power information (including aggressor power level) disclosed in FIGS. 5-7 and/or to the reference power (Pref) disclosed in FIG. 9. One skilled in the art would understand that other points of measurement, for example, within the systems 500, 660, 700 may be used within the scope and spirit of the disclosure.

In various aspects, the strength of the reference signal may be determined at, for example, the power amplifier (PA) output, the coupling filter output, the LNA output, the ADC input, or the ADC output of a system similar to the ones disclosed in FIGS. 5, 6 and/or 7. In various aspects, the strength of the reference signal may be determined by measuring reference signal level from the coefficient control logic of a system similar to the ones disclosed in FIGS. 5, 6 and/or 7.

In block 1120, compare the strength of the reference signal to a first threshold and a second threshold by determining if the strength of the reference signal is a) above the first threshold, b) between the first threshold and the second threshold, or c) below both the first threshold and the second threshold. In various examples, the first threshold is higher than the second threshold. In various examples, the first and second thresholds are control logic thresholds.

Table 1 is an exemplary table of interference to noise ratio (INR) measurements which may be used to derive control logic thresholds. In Table 1, three rows of INR conditions are shown for three example WiFi channels (e.g. 2412 MHz, 2422 MHz, 2432 MHz) and ten columns of INR conditions are shown for ten LTE band 40 channels (e.g. from 2310 MHz to 2390 MHz). Each table entry contains an INR condition in decibels (dB) where a greater value indicates a higher interference level relative to the noise level. For example, the first threshold may be derived from INR conditions exceeding a first INR threshold. For example, the first INR threshold may be 50 dB, and the INR values exceeding the first INR threshold (i.e., exceeding 50 dB) are shown in bold. For example, the second threshold may be derived from INR conditions below the first INR threshold but above the second INR threshold. For example, the second INR threshold may be 10 dB, and the INR values below the below the second INR threshold (i.e., below 10 dB) are shown in italics with underlined. And, for example, the remaining INR values listed in Table 1 are between the first INR threshold and the second INR threshold. Furthermore, the derivation of the first and second thresholds may be obtained by scaling the INR thresholds to signal strength thresholds using appropriate scale factors well known in the art. Table 1 is an example to show the different de-sense levels for different aggressor (B40) and victim (Wi-Fi) channels. Different filters may have different values so values in Table 1 can be updated accordingly.

TABLE 1

| | LTE B40 Channels | | | | | | | | | |
|---|---|---|---|---|---|---|---|---|---|---|
| WiFi Ch. | 2310 MHz | 2315 MHz | 2325 MHz | 2335 MHz | 2345 MHz | 2355 MHz | 2365 MHz | 2375 MHz | 2385 MHz | 2390 MHz |
| 2412 MHz | 19 dB | 20 dB | 23 dB | 26 dB | 30 dB | 35 dB | 41 dB | 70 dB | 97 dB | 102 dB |

TABLE 1-continued

| | LTE B40 Channels | | | | | | | | | |
|---|---|---|---|---|---|---|---|---|---|---|
| 2422 MHz | 3 dB | 1 dB | 1 dB | 4 dB | 7 dB | 12 dB | 17 dB | 61 dB | 90 dB | 98 dB |
| 2432 MHz | 3 dB | 3 dB | 3 dB | 3 dB | 3 dB | 3 dB | 3 dB | 52 dB | 82 dB | 87 dB |

In block 1130, update at least one coefficient if the strength of the reference signal is above the first threshold. In various examples, the at least one coefficient is applied to the reference signal to generate an interference cancelation signal. In various examples, the at least one coefficient is a least mean square (LMS) coefficient, for example, from a one-tap least mean squares (LMS) adaptive filter. In accordance with some aspects of the disclosure, a RF switch is engaged to allow the updated coefficient to be used for interference cancellation in the victim receiver when in the "UPDATE state."

In block 1140, freeze at least one coefficient if the strength of the reference signal is between the first threshold and the second threshold. In freezing the coefficients, this means the coefficients are not being updated and previous coefficients are being applied to generate the interference cancelation signal. In various examples, a predefined time duration is set for using the previous coefficients, after which, the previous coefficients are determined to no longer be valid for usage. In accordance with some aspects of the disclosure, a coefficient control logic operating in baseband is implemented to freeze the at least one coefficient. In accordance with some aspects of the disclosure, a RF switch is engaged to allow the previous coefficients to be used for interference cancellation in the victim receiver when in the "FREEZE state". In various aspects, the RF switch works in conjunction with the coefficient control logic to implement the "FREEZE state" wherein the coefficient control logic freezes the at least one coefficient to the previous coefficient values and the RF switch is engaged to allow the previous coefficients to be used for interference cancellation in the victim receiver. In various examples, the previous coefficients are least mean square (LMS) coefficients, for example, from a one-tap least mean square (LMS) adaptive filter.

In block 1150, set an interference cancelation (IC) circuit (e.g., an AIC circuit) to OFF (i.e., an OFF state) if the strength of the reference signal is below both the first threshold and the second threshold. Various implementations may be used to set the AIC circuit to OFF. In accordance with some aspects of the disclosure, a RF switch may be implemented between the output of the AIC circuit and the input to a victim receiver (e.g., input to an adder within the victim receiver). For example, when the RF switch is disengaged, the output from the AIC circuit is blocked from the input to the victim receiver. In various examples, a coefficient control logic controls whether the RF switch is engaged or disengaged. In accordance with some aspects of the disclosure, a coefficient control logic may be implemented to set the AIC circuit to an OFF state. Following any of the blocks 1130, 1140 or 1150, continue to determine the strength of the reference signal.

In accordance with aspects of the disclosure, the method 1100 may correspond to an algorithm used to perform interference cancellation. The structure/components described above represent means that may be used for performing such interference cancellation. In various aspects, an apparatus for performing interference cancellation includes one or more of the following: a processor; a memory coupled to the processor; a transmitter coupled to the processor; a receiver coupled to the processor; and an interference cancellation circuit coupled between the transmitter and the receiver with the processor configured to perform one or more of steps identified in the blocks of FIG. 11.

Referring back to FIGS. 3-7, in one configuration, the apparatus 300 includes means for observing a signal at baseband, means for determining a digital coefficient for interference cancellation based on a baseband signal, means for converting the digital coefficient to an analog coefficient, means for applying the analog coefficient to an interference cancellation circuit, and means for repeating said observing, determining, converting, and applying until one or more stopping criteria are satisfied. In one aspect, the aforementioned means may be one or more processors 304 and/or circuits 304-*a*, 304-*b*, and/or 304-*c* configured to perform the functions recited by the aforementioned means. In other aspects, the aforementioned means may be respective portions of the block diagrams in FIGS. 4-7 as described above, or any suitable circuit or any apparatus configured to perform the functions recited by the aforementioned means.

Of course, in the above examples, the circuitry included in the processors is merely provided as an example, and other means for carrying out the described functions may be included within various aspects of the present disclosure, including but not limited to the instructions stored in the computer-readable medium 306, or any other suitable apparatus or means described in any one of the figures, and utilizing, for example, the processes and/or algorithms described herein in relation to FIGS. 10,11.

Several aspects of a telecommunications system have been presented. As those skilled in the art will readily appreciate, various aspects described throughout this disclosure may be extended to various types of telecommunication systems, network architectures and communication standards.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first die may be coupled to a second die in a package even though the first die is never directly physically in contact with the second die. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in the figures may be rearranged and/or combined into a single component, step, feature or function or embodied in several components, steps, or functions. Additional elements, components, steps, and/or functions may also be added without departing from novel features disclosed herein. The apparatus, devices, and/or components illustrated in the FIGS. may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of performing interference cancellation in a device having at least one transmitter and at least one receiver, the method comprising:
   determining the strength of a reference signal that corresponds to a transmission from the at least one transmitter;
   comparing the strength of the reference signal to a first threshold and a second threshold; and
   performing one of the following:
      a) updating at least one coefficient for an interference cancellation (IC) circuit if the strength of the reference signal is above the first threshold;
      b) freezing the at least one coefficient for the interference cancellation (IC) circuit if the strength of the reference signal is between the first threshold and the second threshold; or
      c) setting the interference cancelation (IC) circuit to an OFF state if the strength of the reference signal is below both the first threshold and the second threshold.

2. The method of claim 1, wherein the first threshold and the second threshold are derived from a predefined table.

3. The method of claim 2, where the predefined table comprises interference-to-noise ratio (INR) measurements.

4. The method of claim 2, wherein the predefined table comprises one of the following: received signal strength indication (RSSI) measurements, bit error rate (BER) measurements, or signal-to-interference and noise ratio (SINR) measurements.

5. The method of claim 1, wherein the first threshold is higher than the second threshold in value.

6. The method of claim 5, wherein the strength of the reference signal is measured at one of the following locations: a transmitter power amplifier (PA) output, or an output of a coupling filter coupled to the at least one transmitter.

7. The method of claim 5, wherein the strength of the reference signal is measured from a transmit power controller.

8. The method of claim 1, wherein the strength of the reference signal is determined by measuring a reference signal level from a coefficient control logic for configuring the at least one coefficient to apply to an adaptive filter coupled to the at least one receiver.

9. The method of claim 1, wherein the at least one coefficient is a least mean square (LMS) coefficient derived from a one-tap least mean squares (LMS) adaptive filter.

10. The method of claim 1, wherein a coefficient control logic operating in baseband is implemented for freezing the at least one coefficient.

11. The method of claim 10, wherein the freezing expires after a predefined time duration.

12. The method of claim 1, wherein an RF switch is implemented for setting the interference cancelation (IC) circuit to the OFF state.

13. The method of claim 1, wherein a coefficient control logic operating in baseband is implemented for setting the interference cancelation (IC) circuit to the OFF state.

14. The method of claim 13, wherein the at least one coefficient is set to zero.

15. The method of claim 1, wherein an RF switch is engaged to allow the updated at least one coefficient to be used for interference cancellation.

16. The method of claim 1, wherein a coefficient control logic operating in baseband is implemented for updating the at least one coefficient.

17. The method of claim 1, wherein a coefficient control logic operating in baseband performs one of the following: a) updating the at least one coefficient, b) freezing the at least one coefficient or c) setting the interference cancelation (IC) circuit to the OFF state, based on one or more of the following features of the at least one transmitter: transmitter state, transmit start time, transmit stop time, transmit power level, nonlinear characteristics, frequency separation between the at least one transmitter and the at least one receiver.

18. An apparatus for performing interference cancellation comprising:
   at least one processor;
   a memory coupled to the at least one processor;
   at least one transmitter coupled to the at least one processor;
   at least one receiver coupled to the at least one processor; and
   an interference cancellation (IC) circuit coupled between the at least one transmitter and the at least one receiver, wherein the at least one processor is configured to:

determine the strength of a reference signal that corresponds to a transmission from the at least one transmitter;

compare the strength of the reference signal to a first threshold and a second threshold; and perform one of the following:
a) updating at least one coefficient for the interference cancellation (IC) circuit if the strength of the reference signal is above the first threshold;
b) freezing the at least one coefficient for the interference cancellation (IC) circuit if the strength of the reference signal is between the first threshold and the second threshold; or
c) setting the interference cancelation (IC) circuit to an OFF state if the strength of the reference signal is below both the first threshold and the second threshold.

19. The apparatus of claim 18, wherein the first threshold and the second threshold are derived from a predefined table, wherein the predefined table comprises one of the following: received signal strength indication (RSSI) measurements, bit error rate (BER) measurements, interference-to-noise ratio (INR) measurements, or signal-to-interference and noise ratio (SINR) measurements.

20. The apparatus of claim 18, wherein the strength of the reference signal is measured at one of the following locations: a transmitter power amplifier (PA) output, or an output of a coupling filter coupled to the at least one transmitter.

21. The apparatus of claim 18, wherein a coefficient control logic operating in baseband is implemented for freezing the at least one coefficient and wherein the freezing expires after a predefined time duration.

22. The apparatus of claim 18, wherein an RF switch is implemented for setting the interference cancelation (IC) circuit to the OFF state.

23. The apparatus of claim 18, wherein a coefficient control logic operating in baseband is implemented for setting the interference cancelation (IC) circuit to the OFF state or for updating the at least one coefficient.

24. The apparatus of claim 18, wherein an RF switch is engaged to allow the updated at least one coefficient to be used for interference cancellation.

25. The apparatus of claim 18, wherein a coefficient control logic operating in baseband performs one of the following: a) updating the at least one coefficient, b) freezing the at least one coefficient or c) setting the interference cancellation (IC) circuit to the OFF state, based on one or more of the following features of the at least one transmitter: transmitter state, transmit start time, transmit stop time, transmit power level, nonlinear characteristics, frequency separation between the at least one transmitter and the at least one receiver.

26. An apparatus for performing interference cancellation comprising:
at least one transmitter;
at least one receiver;
means for interference cancellation, coupled between the at least one transmitter and the at least one receiver;
means for determining the strength of a reference signal that corresponds to a transmission from the at least one transmitter;
means for comparing the strength of the reference signal to a first threshold and a second threshold; and
means for performing one of the following:
a) updating at least one coefficient for the interference cancellation means if the strength of the reference signal is above the first threshold;
b) freezing the at least one coefficient for the interference cancellation means if the strength of the reference signal is between the first threshold and the second threshold; or
c) setting the interference cancelation means to an OFF state if the strength of the reference signal is below both the first threshold and the second threshold.

27. The apparatus of claim 26, wherein the first threshold and the second threshold are derived from a predefined table.

28. A non-transitory computer-readable medium storing computer executable code, operable on a device comprising at least one transmitter, at least one receiver, and an interference cancellation (IC) circuit coupled between the at least one transmitter and the at least one receiver, the computer executable code comprising:
instructions for causing a computer to determine the strength of a reference signal that corresponds to a transmission from the at least one transmitter;
instructions for causing the computer to compare the strength of the reference signal to a first threshold and a second threshold; and
instructions for causing the computer to perform one of the following:
a) updating at least one coefficient for the interference cancellation (IC) circuit if the strength of the reference signal is above the first threshold;
b) freezing the at least one coefficient for the interference cancellation (IC) circuit if the strength of the reference signal is between the first threshold and the second threshold; or
c) setting the interference cancelation (IC) circuit to an OFF state if the strength of the reference signal is below both the first threshold and the second threshold.

29. The non-transitory computer-readable medium of claim 28, wherein the computer executable code for causing the computer to perform one of the following: a) updating the at least one coefficient, b) freezing the at least one coefficient or c) setting the interference cancelation (IC) circuit to the OFF state, is based on one or more of the following features of the at least one transmitter: transmitter state, transmit start time, transmit stop time, transmit power level, nonlinear characteristics, frequency separation between the at least one transmitter and the at least one receiver.

30. The non-transitory computer-readable medium of claim 28, wherein the first threshold and the second threshold are derived from a predefined table.

* * * * *